(12) United States Patent  (10) Patent No.: US 8,655,760 B1
O'Malley et al.  (45) Date of Patent: Feb. 18, 2014

(54) METHOD AND SYSTEM FOR VALIDATING THE QUALITY OF STREAMING FINANCIAL SERVICES DATA

(71) Applicant: FMR LLC, Boston, MA (US)

(72) Inventors: Fintan O'Malley, Oranmore (IE); Conor O'Sullivan, Beaufort (IE); David Murphy, Galway (IE); Thomas McGuire, Claregalway (IE)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 13/722,513

(22) Filed: Dec. 20, 2012

(51) Int. Cl.
*G06Q 40/00* (2012.01)
*G06Q 40/04* (2012.01)

(52) U.S. Cl.
CPC ........................ *G06Q 40/04* (2013.01)
USPC .................................... 705/35; 705/37

(58) Field of Classification Search
CPC ....................................................... G06Q 40/04
USPC ........................................................ 705/35, 37
See application file for complete search history.

(56) References Cited

U.S. PATENT DOCUMENTS

| | | | |
|---|---|---|---|
| 5,987,432 A * | 11/1999 | Zusman et al. ................. | 705/35 |
| 7,251,578 B1 | 7/2007 | Chen et al. | |
| 7,620,533 B2 | 11/2009 | Bolt et al. | |
| 7,676,523 B2 | 3/2010 | Klein et al. | |
| 2009/0106837 A1 | 4/2009 | Tavani | |
| 2009/0307766 A1 | 12/2009 | Rose et al. | |
| 2011/0178911 A1* | 7/2011 | Parsons et al. ................. | 705/35 |
| 2012/0246052 A1* | 9/2012 | Taylor et al. ................... | 705/37 |

OTHER PUBLICATIONS

Achieving Efficiencies in Market Data Management Apr. 2011.*
Market Data Feed With Tris Telekurs RMDS Integration Service Jul. 2008.*
Market Data Feed Go with the flow. Six Telekurs Aug. 2010.*
Activ Financial, ACTIV Content Platform Overview, Mar. 6, 2009, 11 pages.
"Automated Analysis of News to Compute Market Sentiment: Its Impact on Liquidity and Trading—The Future of Computer Trading in Financial Markets—Foresight Driver Review—DR 8," Government Office for Science, Foresight, Jul. 20, 2011, 29 pages.
Brabazon, A. and O'Neill, M, "Biologically inspired Algorithms for Financial Modelling," Neural Network Methodologies; Springer-Verlang Berlin Heidelberg, 2006.
http://www.clarity-centre.org/content/sentiment-al-web, accessed Mar. 22, 2013, 3 pages.

* cited by examiner

*Primary Examiner* — William Rankins
(74) *Attorney, Agent, or Firm* — Proskauer Rose LLP

(57) ABSTRACT

Methods and systems for providing validating financial services data is provided. The financial services data is translated into a normalized format. The normalized financial services data is validated with one or more validations modules, and an alert is transmitted if any of the validations fail.

20 Claims, 3 Drawing Sheets

METHOD AND SYSTEM FOR VALIDATING THE QUALITY OF STREAMING FINANCIAL SERVICES DATA

FIELD OF THE INVENTION

The invention relates generally to a method and system for monitoring and validating the quality of streaming financial services data. More specifically, if any validation fails, an alert can be issued.

BACKGROUND

Financial services data (e.g., market data feeds) transmit real-time quote and trade related data associated with various investment instruments to institutional or individual investors. The institutional or individual inventors can make decisions (e.g., on the spot decisions) about buying or selling investment instruments based on the financial services data. Financial services data can also be used to project pricing trends and/or calculate market risks on portfolios of investments.

Current systems that receive financial services data typically verify that they have received data in an expected format based on checking the fields of the received data.

Financial services data typically has a known format, e.g., known fields at particular locations, such that a system that receives the market data feed can determine whether the data it received is the data it expects. If the received data deviates from the known/expected format, then the system can alert users that there is a problem with the format of the received data.

Beyond detecting defective format issues, current systems lack a mechanism for validating that the value of financial services data is not erroneous and/or is meaningful. For example, for a market data feed containing a trade quote, if the trade quote jumps a large percentage (e.g., %300 percent) in less then an amount of time (e.g., a minute) there is likely an error in the value of the trade quote. Current systems do not detect the error in the data because they lack a mechanism for validating that the value of the data is erroneous.

Therefore, it is desirable to verify received market data beyond verifying that the data is in an expected format.

SUMMARY OF THE INVENTION

Advantages of the invention include avoidance of decision making based on financial data that is not accurate. Another advantage of the invention is that value errors within large amounts of financial services data received by a computer over a short period of time can be detected by the computer prior to presentation on the computer or transmitting to consuming applications. Another advantage of the invention includes early warning monitoring before data is embedded in the downstream systems.

In one aspect, the invention features a computerized-method for validation of financial services data. The method involves translating, by an adapter module, received financial services data into a normalized format. The method also involves determining, by a first validation module, whether the financial services data passes a security validation, the security validation requiring the financial services data values to meet predefined criteria with expected values. The method also involves determining, by a second validation module, whether the financial services data passes a threshold validation, the threshold validation requiring the financial services data values to meet specified thresholds. The method also involves determining, by a third validation module, whether the financial services data passes a source validation, the source validation requiring the financial services data values to meet specified thresholds based on information received from external data sources. The method also involves transmitting, by an alert monitor module, one or more indicators if any of the validations fails.

In some embodiments, determining whether the financial services data passes a source validation involves storing selected previously received data and periodically updating the specified thresholds based on the stored data and the external data sources. In some embodiments, the first validation module, the second validation module and the third validation module each receive feedback to determine one or more data patterns to optimize detecting a failed validation.

In some embodiments, the financial services data is real-time data, intraday data, historical data, summary data, reference data, or any combination thereof. In some embodiments, the financial services data is for equities, bonds, derivatives, indices, or any combination thereof. In some embodiments, the computerized-method involves transmitting from a configuration database the expected values to the first validation module.

In some embodiments, the expected values are based on financial event type, indices, permissions from the financial services data provider, or any combination thereof. In some embodiments, the computerized-method involves transmitting from a configuration database the specified thresholds to the second validation module. In some embodiments, the specified thresholds for threshold validation are based on dynamically adjusted previously received financial services data.

In some embodiments, the computerized-method involves providing, by the second validation module, a failure level for a failed threshold validation, failure level indicates whether the failure should be reported by the alert monitor module as informational, as a warning, as an error, or as a critical failure. In some embodiments, the external data sources include internet news feeds, internet blogs, internet forums, internet reviews, internet micro-blogs, or any combination thereof.

In another aspect, the invention features a system for validation financial services data. The system includes a source adapter module that translates received financial services data into a normalized format. The system also includes a validation engine comprising a first, second and third validation module, the validation module receives the financial services data from the source adapter module. The system also includes a cache, the cache stores financial services data received from the validation engine and transmits stored financial services data values to the validation engine. The system also includes an alerting engine that transmits an alert when the financial services data fails any of the validations of the validation engine.

In some embodiments, the first validation module determines whether the financial services data passes a security validation, the security validation requiring the financial services data values to meet predefined criteria with expected values. In some embodiments, the second validation module determines whether the financial services data passes a threshold validation, the threshold validation requiring the financial services data values to meet specified thresholds.

In some embodiments, the specified thresholds for threshold validation are based on previously received financial services data. In some embodiments, the third validation module determines whether the financial services data passes a source validation, the source validation requiring the financial services data values to meet specified thresholds based on information received from external data sources.

In some embodiments, the specified thresholds vary over time. In some embodiments, the specified thresholds vary based on Machine Learning Algorithms. In some embodiments, the specified thresholds vary base don Multi-Layer Perception.

Other aspects and advantages of the invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

DETAILED DESCRIPTION

Generally, the invention includes a validation engine that validates financial services data received by the validation engine. The validation engine includes three validation modules. A source adapter module can normalize the financial services data. The financial services data can be transmitted by the validation engine to consuming applications. In some embodiments, the consuming application and the validation engine are on a single computing device. The financial services data can be transmitted via the world wide web, or internal networks to the validation engine. The financial services data can be financial services engine data feeds that transmit data to computers that subscribe to the data feed.

The source adapter module receives financial services data and converts the financial services data into a normalized format. The financial services data can be stored in a cache. Once in the normalized format, the financial services data is transmitted to the validation engine from the source adapter module. The validation engine validates that the data passes a security validation, a threshold validation, and a source validation. If any of the validations fail, an alerting engine sends one or more indicators that indicates one or more of the validations failed.

Figure 1:
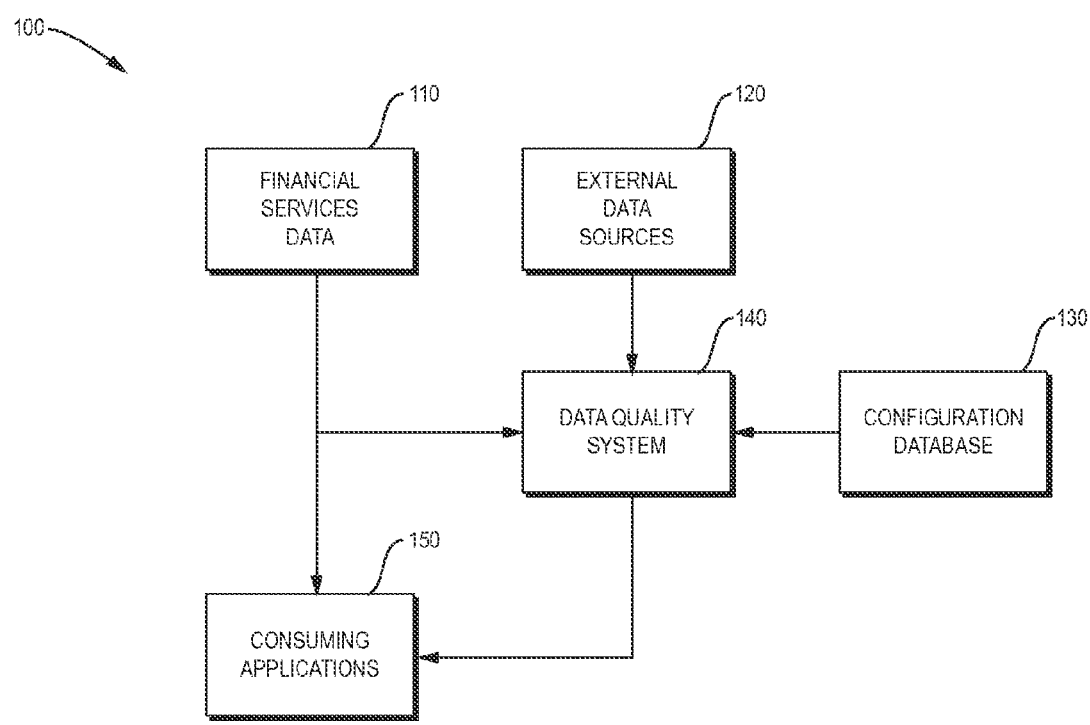
FIG. 1 is a block diagram showing a system for transmitting, receiving, and validating financial services data, according to an illustrative embodiment of the invention.

FIG. 1 is a block diagram showing a system 100 for transmitting, receiving, and validating financial services data, according to an illustrative embodiment of the invention. The system 100 includes financial services data input 110, external data source input 120, a configuration database input 130, a data quality system 140, and consuming applications 150.

The financial services data input 110 is coupled to the data quality system 140 and the consuming applications 150. The financial services data input 110 transmits financial services data to the data quality system 140 and the consuming applications 150. The financial services data input 110 can be transmitted to the data quality system 140 and the consuming applications 150 at a frequency. The frequency can depend on the type of financial services data input 110. For example, for financial services data input 100 that is a market data feed of equity price movement or dividend splits, the market data is received at an average frequency of 2,500 updates per second. It is apparent to one of ordinary skill in the art that financial service data providers each have specific frequency, bandwidth, format requirements, broader market data coverage or depth of data, latency of feed, real-time vs. delayed, snap vs. streaming data for the financial service data each transmits.

The data quality system 140 is coupled to the financial services data input 110, the external data source input 120, the configuration database input 130 and the consuming applications 150. The data quality system 140 receives financial services data from the financial service data input 110, external source data from external data source input 120, and threshold configuration parameters from the configuration database input 130. The data quality system 140 determines whether the financial services data input 110 is valid based on the external source data, the threshold configuration parameters and known properties of the financial service data. If the data quality system 140 determines that the financial services data fails validation, then the data quality system 140 transmits an indicator of validation failure to the consuming applications 140.

In some embodiments, the consuming applications 140 are Fidelity.com, Wealth App Pro, and/or Active trader pro.

Figure 2:
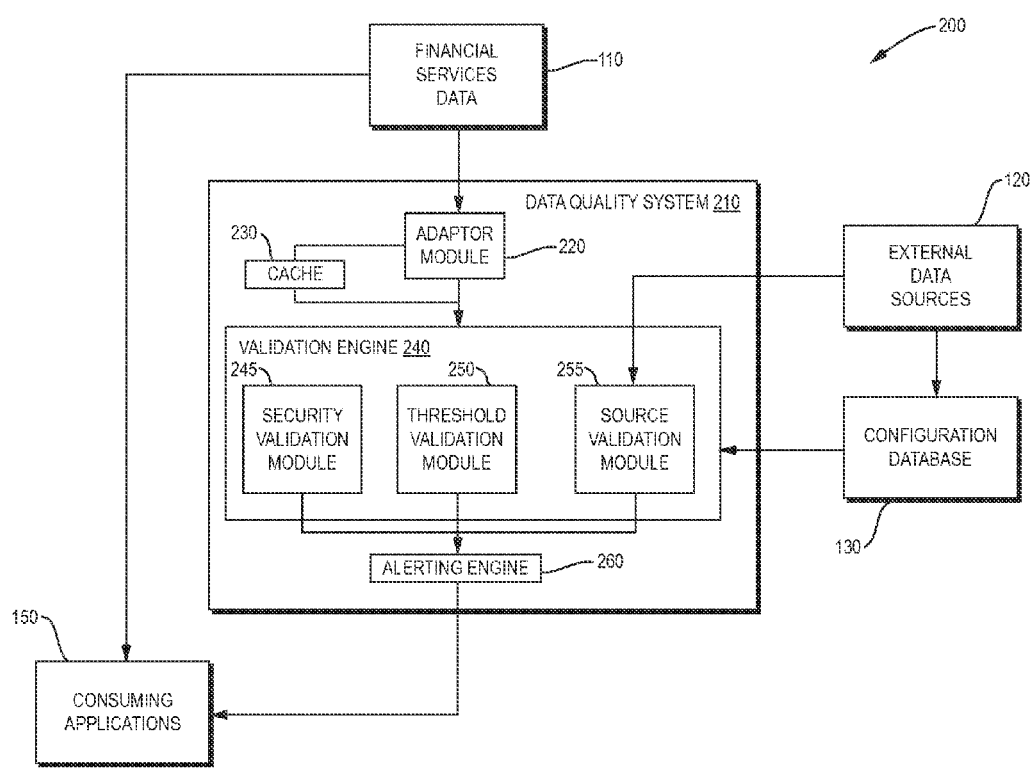
FIG. 2 is a block diagram showing a system for validating financial services data, according to an illustrative embodiment of the invention.

FIG. 2 is a block diagram showing a system 200 for validating financial services data, according to an illustrative embodiment of the invention. The system 200 includes financial services data input 110, external data source input 120, configuration database input 130, a data quality system 210, and consuming applications 150.

The financial services data input 110 is coupled to the data quality system 210 and the consuming applications 150. The financial services data input 110 transmits financial services data to the data quality system 210 and the consuming applications 150.

The external data sources 120 are coupled to the data quality system 210 via the source validation module 255. In some embodiments, the external data sources 120 includes news feeds, blogs, micro-blogs (e.g., Twitter) internet forums, corporate actions, reference sources, mutual funds, and/or Options data from Options Price Reporting Authority (OPRA).

The data quality system 210 is coupled to the financial services data input 110, the external data source input 120, configuration database input 130, and the consuming applications 150. The data quality system 210 includes an adaptor module 220, a cache 230, a validation engine 240, and an alerting engine 260.

The adaptor module 220 is coupled to financial services data input 110, the cache 230 and the validation engine 240. The adaptor module 220 receives financial services data from the financial services data input 110. The adaptor module can normalize the financial services data by converting the financial services data into a desired format.

The adaptor module 220 transmits the normalized financial services data to the cache 230 and the validation engine 240. The cache 230 can store the financial services data. In some embodiments, the cache 230 stores the normalized financial services data based on an entity name associated with the financial services data and symbol associated with the entity name. For example, Apple Corp or APPL. In some embodiments, the validations modules within the validation engine 240 can be in communication with the cache 230 to store values within the cache 230.

The validation engine 240 includes a first validation module (e.g., a security validation module 245), a second validation module (e.g., a threshold validation module 250), and a third validation module (e.g., source validation module 255). Each of the validation modules within the validation engine 240 receives the normalized financial services data.

The security validation module 230 receives the normalized financial services data and determines if the values of the normalized financial services data meet predefined criteria (e.g., includes an expected name) within expected values. The security validation module 230 transmits a failure indicator to the alerting engine 260 if the financial services data does not meet the predefined criteria.

In some embodiments, the expected values are based on financial event type, financial instrument, permissions from the financial services data provider, or any combination thereof. In some embodiments, the financial services data is received from a configuration database (not shown). In some embodiments, the predefined criteria is specified by user input, for example, a trade record should have a numerical trade price.

The threshold validation module 250 receives the normalized financial services data and specified thresholds from the configuration database module 130. The threshold validation module 250 determines if the values of the normalized financial services data meet the specified thresholds. The threshold validation module 250 transmits a failure indicator to the alerting engine 260 if the financial services data is not within the specified thresholds.

In some embodiments, the specified thresholds are based on previously received financial services data, specified by user input, and/or based on learning algorithms, for example, the Simple Moving Average (SMA).

The source validation module 255 receives the normalized financial services data and data from the external data sources 120. The source validation module 255 determines if the values of the normalized financial services data meet specified thresholds that are based on the data from the external data sources 120. The source validation module 255 transmits a failure indicator to the alerting engine 260 if the financial services data does not meet the specified thresholds.

In some embodiments, the source validation module 255 performs sentiment analysis of the data from the external data sources 120 to determine the specified thresholds. In some embodiments, the sentiment analysis is performed on a particular topic. Particular topics can include brands, personas, events, nations, organizations, politics, and/or macro economics. In some embodiments, the source validation module 255 uses both the determined specified thresholds and the specified thresholds from the configuration database 130 to validate the financial services data.

In some embodiments, the validation engine 240 can include any number of user defined validation modules. Each validation module can include a common interface that takes as input the normalized financial services data such that any operations performed on the financial services data within a particular validation module can be performed without modifying the validation module interface. Each validation module can produce an indicator that includes the results of the validation. The indicator can include a result of the validation (e.g., pass or fail), a level of the validation (e.g., informational, warning, error, or critical), and/or a message (e.g., cause of failure, symbol and/or values). In some embodiments, any of the validation modules can determine validation based on data patterns. For example, moving average can change the upper and lower thresholds over time. In some embodiments, one or more of the validation modules within the validation engine receives feedback from its respective output. In some embodiments, the feedback can determine whether the validation passes or fails. For example, passing or failing can correlate to the upper and lower thresholds.

Figure 3:
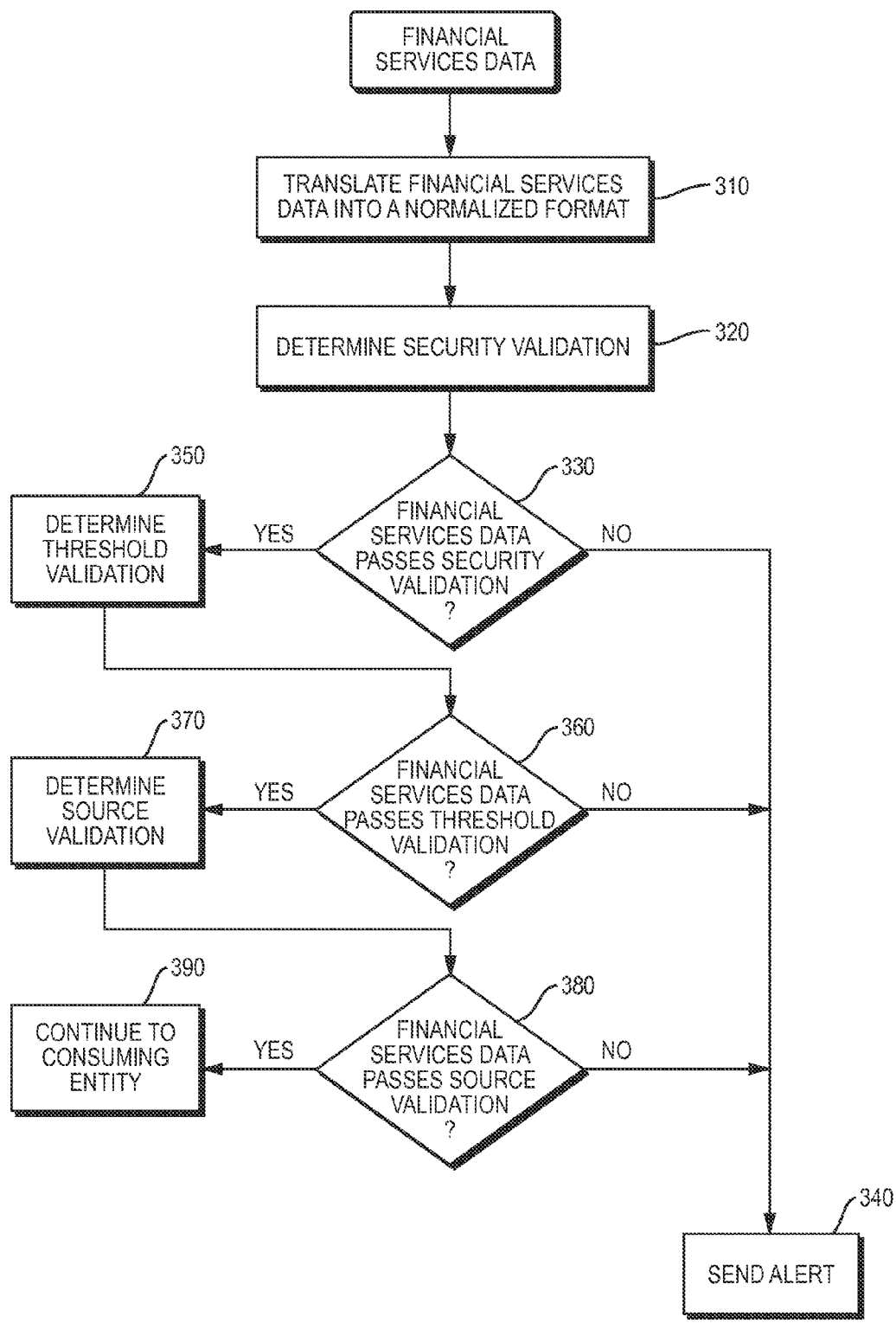
FIG. 3 is a flow diagram showing a method for validating financial services data, according to an illustrative embodiment of the invention.

FIG. 3 is a flow diagram 300 showing a method for validating financial services data, according to an illustrative embodiment of the invention. The method involves translating received financial services data into a normalized (e.g., common) format (Step 310). The financial services data can be from any financial services data source, for example, Reuter IDS and/or Active financial feeds. For example, table 1 shows an exemplary normalized format for financial services data.

TABLE 1

Normalized Format

Data Update (EntityName, DataField List, MetaData List)
DataField (fieldId, fieldName, fieldValue, MetaData List)

As shown above in table 1, the normalized format can include a Data Update entry and a Data Field entry.

The Data Update entry can include the fields of EntityName, DataField List, and MetaData List. The EntityName field is the name of the market data instrument that the financial services data belongs to (e.g., a market data symbol of IBM). The Data Field List is a list of DataField items that belong to the update. The MetaData List can include any other data item that describes the received financial services data but are not part of the field values of the financial services data (e.g., trade, quote, etc.).

The DataField entry can include the fields of fieldId, fieldName, fieldValue, MetaData List. The fieldId is an identification of the source of the financial services data (e.g., the vendor). The fieldName is the name of the field (e.g., TradePrice). The fieldValue is the current value of the field (e.g., 12.54). The MetaData List can include any other data item that describes the particular data entry field (e.g., last trade price). It is apparent to one of ordinary skill that the normalized format shown in Table 1 is exemplary only and that the data can be normalized into alternative formats.

The method also involves determining whether the financial services data passes a security validation (e.g., using security validation module 245, as described above in FIG. 2) (Step 320). The security validation includes determining whether the financial services data meet predefined criteria with expected values. The predefined criteria can include criteria specified by a particular financial services data provider or user. The expected values can be based on financial event type, financial instrument, permissions from the financial services data provider, or any combination thereof. Table 2 shown below is an example of expected values for the trade event for symbol IBM.

TABLE 2

Update - Event Type ID:1 - Table Number: 0 - Jul. 10, 2012 16:18:09.181
TradeSize:100
Trade:187.3<+–>
TradeExchange:BT
CumulativeValue:270634951.9952
CumulativePrice:1742254.2896
TradeTime:11:18:08.937
TradeCount:9234
CumulativeVolume:1433780
TradeId:386435
LastReportedTradeTime:11:18:08.937
NetChange:–2.37<+>
PercentChange:–1.25<+>

TABLE 2-continued

```
LastReportedTradeSize:100
LastReportedTrade:187.3<+>
LastReportedTradeExchange:BT
LastReportedTradeId:386435
```

In some embodiments, the security validation involves checking entity type (e.g., equity, indices and/or pinksheet), event type (trade, quote and/or tick), and permissions. In some embodiments, event type and pinksheets includes verifying the fields of a trade event, a quote event and/or any other event type. Verifying the fields of a trade event can include verifying that the tradeId field is present (e.g., TradeId as shown above in Table 2), and that the TradeTime field is present (e.g., TradeTime as shown above in Table 2) and not in the past. Verifying the fields of a quote event can include verifying that the BidTime field is present, and that the AskTime field is present and includes the current time.

In some embodiments, verifying the indices includes validating the tick event field or any other event type field. Verifying the tick event field and/or the any other event type field can include verifying that the TradeTime field is present and not in the past.

In some embodiments, verifying the permissions field can include verifying that there are no permission errors in the financial services data.

The method also involves checking if the security validation passes (Step 330). If the security validation fails an alert is sent (e.g., via alert engine 250, as described above in FIG. 2) (Step 340). If the security validation passes, the method involves determining whether the financial services data passes a threshold validation (e.g., via the threshold validation module, as shown above in FIG. 2) (Step 350).

Determining whether the financial services data passes the threshold validation can include verifying that the financial services data or some combination of the financial services data is within specified thresholds. In some embodiments, the specified thresholds are based on previously received financial services data and/or stored data (e.g., data stored in the configuration module 130 and/or data stored in the cache 230). In some embodiments, the specified thresholds are dynamically adjusted. In some embodiments, the specified thresholds include a failure level. The failure level can include an informational threshold, a warning threshold, an error threshold, and/or a critical threshold. For example, for financial services data of a TradePrice the thresholds can indicate an allowable percent change from a previously received TradePrice, with an informational threshold of 2-3%, a warning threshold of 3-4%, an error threshold of 4-7%, and a critical threshold of greater than or equal to 8%. In some embodiments, a validation failure occurs if the information threshold, the warning threshold, the error threshold, the critical threshold or any combination thereof is not met.

In some embodiments, the financial services data is financial services data indicators that are determined from the financial services data. Table 3, shown below, shows examples of financial services data indicators that can be compared to specified thresholds.

TABLE 3

| Financial Services Indicator |
| --- |
| Accumulation Distribution Line |
| Aroon |
| Average Directional Index (ADX) |
| Average True Range (ATR) |
| % B Indicator |
| Commodity Channel Index (CCI) |
| Coppock Curve |
| Correlation Coefficient |
| Chaikin Money Flow |
| Detrended Price Oscillator (DPO) |
| Ease of Movement (EMV) |
| Force Index |
| Know Sure Thing (KST) |
| Mass Index |
| MACD |
| MACD-Histogram |
| Money Flow Index (MFI) |
| Negative Volume Index (NVI) |
| On Balance Volume (OBV) |
| Percentage Price Oscillator (PPO) |
| Percentage Volume Oscillator |
| Price Relative |
| Rate of Change (ROC) |
| Relative Strength Index (RSI) |
| StockCharts Technical Rank (SCTR) |
| Slope |
| Standard Deviation (Volatility) |
| Stochastic Oscillator |
| StochRSI |
| TRIX |
| True Strength Index |
| Ulcer Index |
| Ultimate Oscillator |
| Vortex Index |
| William % R |

The method also involves checking if the threshold validation passes (Step 360). If the threshold validation fails an alert is sent (e.g., via alert engine 250, as described above in FIG. 2) (Step 340). If the threshold validation passes, the method involves determining whether the financial services data passes a source validation (Step 370).

Determining whether the financial services data passes the source validation can include verifying that the financial services data or some combination of the financial services data is within specified thresholds (e.g., via source validation module 255) that are based upon information received from external data sources (e.g., external data sources 120). For example, the specified thresholds can be determined based on artificial intelligence methods. In some embodiments, the artificial intelligence methods are based on passive recognition. The passive recognition reviews previous financial services data input and builds patterns to detect known errors. The patterns can be used to set the specified thresholds such that financial services data that is erroneous is detected. In some embodiments, the artificial intelligence methods are any artificial intelligence methods currently known in the art. In some embodiments, the specified thresholds are based on learning methods. In some embodiments, the learning methods are based on learning methods known in the art. For example, the specified thresholds can be determined based on the Multi-Layer Perception method found in the book entitled "Biologically inspired Algorithms for Financial Modeling" by Anthony Brabazon and Michael O'Neill, published by Springer-Verlang Berlin Heidellberg, 2006, the entire contents of which are incorporated herein by reference.

In some embodiments, if the threshold validation fails (Step 360), instead of sending an alert (Step 340), the financial services data is checked for source validation (Steps 370 and 380). If the source validation passes, then the threshold validation failure is ignored and an alert is not sent, the financial services data is transmitted to a consuming application (Step 390).

The above-described systems and methods can be implemented in digital electronic circuitry, in computer hardware, firmware, and/or software. The implementation can be as a computer program product (e.g., a computer program tangibly embodied in an information carrier). The implementation can, for example, be in a machine-readable storage device for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by an apparatus and can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device, a transmitting device, and/or a computing device. The display device can be, for example, a cathode ray tube (CRT) and/or a liquid crystal display (LCD) monitor. The interaction with a user can be, for example, a display of information to the user and a keyboard and a pointing device (e.g., a mouse or a trackball) by which the user can provide input to the computer (e.g., interact with a user interface element). Other kinds of devices can be used to provide for interaction with a user. Other devices can be, for example, feedback provided to the user in any form of sensory feedback (e.g., visual feedback, auditory feedback, or tactile feedback). Input from the user can be, for example, received in any form, including acoustic, speech, and/or tactile input.

The computing device can include, for example, a computer, a computer with a browser device, a telephone, an IP phone, a mobile device (e.g., cellular phone, personal digital assistant (PDA) device, laptop computer, electronic mail device), and/or other communication devices. The computing device can be, for example, one or more computer servers. The computer servers can be, for example, part of a server farm. The browser device includes, for example, a computer (e.g., desktop computer, laptop computer, tablet) with a world wide web browser (e.g., Microsoft® Internet Explorer® available from Microsoft Corporation, Chrome available from Google, Mozilla® Firefox available from Mozilla Corporation, Safari available from Apple). The mobile computing device includes, for example, a personal digital assistant (PDA).

Website and/or web pages can be provided, for example, through a network (e.g., Internet) using a web server. The web server can be, for example, a computer with a server module (e.g., Microsoft® Internet Information Services available from Microsoft Corporation, Apache Web Server available from Apache Software Foundation, Apache Tomcat Web Server available from Apache Software Foundation).

The storage module can be, for example, a random access memory (RAM) module, a read only memory (ROM) module, a computer hard drive, a memory card (e.g., universal serial bus (USB) flash drive, a secure digital (SD) flash card), a floppy disk, and/or any other data storage device. Information stored on a storage module can be maintained, for example, in a database (e.g., relational database system, flat database system) and/or any other logical information storage mechanism.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

The above described networks can be implemented in a packet-based network, a circuit-based network, and/or a combination of a packet-based network and a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A computerized-method for validation of financial services data, the method comprising:
   translating, by a computing device, received financial services data into a normalized format;
   determining, by the computing device, whether the financial services data passes a security validation, the security validation requiring the financial services data values to meet predefined criteria with expected values;
   determining, by the computing device, whether the financial services data passes a threshold validation, the threshold validation requiring the financial services data values to meet specified thresholds;
   determining, by the computing device, whether the financial services data passes a source validation, the source validation requiring the financial services data values to meet specified thresholds based on information received from external data sources; and
   transmitting, by the computing device, one or more indicators if any of the validations fails.

2. The computerized-method of claim 1 wherein determining whether the financial services data passes a source validation further comprises:
   storing selected previously received data; and
   periodically updating the specified thresholds based on the stored data and the external data sources.

3. The computerized-method of claim 1 wherein the computing device receives feedback to determine one or more data patterns to optimize detecting a failed validation.

4. The computerized-method of claim 1 wherein the financial services data is real-time data, intraday data, historical data, summary data, reference data, or any combination thereof.

5. The computerized-method of claim 1 wherein the financial services data is for equities, bonds, derivatives, indices, or any combination thereof.

6. The computerized-method of claim 1 further comprising transmitting from a configuration database the expected values to the computing device.

7. The computerized-method of claim 1 wherein the expected values are based on financial event type, indices, permissions from the financial services data provider, or any combination thereof.

8. The computerized-method of claim 1 further comprising transmitting from a configuration database the specified thresholds to the computing device.

9. The computerized-method of claim 1 wherein the specified thresholds for threshold validation are based on dynamically adjusted previously received financial services data.

10. The computerized-method of claim 1 further comprising providing, by the computing device, a failure level for a failed threshold validation, the failure level indicates whether the failure should be reported by the computing device as informational, as a warning, as an error, or as a critical failure.

11. The computerized-method of claim 1 wherein the external data sources include internet news feeds, internet blogs, internet forums, internet reviews, internet micro-blogs, or any combination thereof.

12. A system for validation of financial services data, the system comprising:
    a source adapter module, executing on a computing device, that translates received financial services data into a normalized format;
    a validation engine comprising a first validation module, a second validation module and a third validation module executed on the computing device, the validation engine receiving the financial services data from the source adapter module;
    a cache, the cache stores financial services data received from the validation engine and transmits stored financial services data values to the validation engine; and
    an alerting engine, executing on the computing device, that transmits an alert when the financial services data fails any validation performed by the validation engine.

13. The system of claim 12 wherein the first validation module, executing on the computing device, determines whether the financial services data passes a security validation, the security validation requiring the financial services data values to meet predefined criteria with expected values.

14. The system of claim 12 wherein the second validation module, executing on the computing device, determines whether the financial services data passes a threshold validation, the threshold validation requiring the financial services data values to meet specified thresholds.

15. The system of claim 14 wherein the specified thresholds for threshold validation are based on previously received financial services data.

16. The system of claim 12 wherein the third validation module, executing on the computing device, determines whether the financial services data passes a source validation, the source validation requiring the financial services data values to meet specified thresholds based on information received from external data sources.

17. The system of claim 16 wherein the specified thresholds vary over time.

18. The system of claim 17 wherein the specified thresholds vary based on Machine Learning Algorithms.

19. The system of claim 18 the specified thresholds vary based on Multi-Layer Perception.

20. The system of claim 16 wherein the external data sources include internet news feeds, internet blogs, internet forums, internet reviews, internet micro-blogs, or any combination thereof.

* * * * *